(12) United States Patent
Scarcelli et al.

(10) Patent No.: US 12,216,776 B2
(45) Date of Patent: Feb. 4, 2025

(54) SYSTEMS AND METHODS FOR NOISE-RESISTANT QUANTUM COMMUNICATION USING HYPERENTANGLEMENT

(71) Applicants: UNIVERSITY OF MARYLAND, COLLEGE PARK, College Park, MD (US); POSTECH RESEARCH AND BUSINESS DEVELOPMENT FOUNDATION, Gyeongsangbuk-do (KR)

(72) Inventors: Giuliano Scarcelli, Washington, DC (US); Yoon-Ho Kim, Gyeongsangbuk-do (KR); Jin-Hun Kim, Gyeongsangbuk-do (KR)

(73) Assignees: University of Maryland, College Park, College Park, MD (US); POSTECH RESEARCH AND BUSINESS DEVELOPMENT FOUNDATION, Gyeongsangbuk-do (KR)

( * ) Notice: Subject to any disclaimer, the term of this patent is extended or adjusted under 35 U.S.C. 154(b) by 0 days.

(21) Appl. No.: 18/700,030

(22) PCT Filed: Nov. 10, 2022

(86) PCT No.: PCT/US2022/049512
§ 371 (c)(1),
(2) Date: Apr. 10, 2024

(87) PCT Pub. No.: WO2023/086450
PCT Pub. Date: May 19, 2023

(65) Prior Publication Data
US 2024/0338466 A1    Oct. 10, 2024

Related U.S. Application Data

(60) Provisional application No. 63/263,859, filed on Nov. 10, 2021.

(51) Int. Cl.
*G06N 10/60* (2022.01)
*G06F 21/60* (2013.01)

(52) U.S. Cl.
CPC ........... *G06F 21/606* (2013.01); *G06N 10/60* (2022.01)

(58) Field of Classification Search
CPC ........ G06N 10/00; G06N 10/60; G06N 10/70; G06N 10/80; G06N 10/40; G06N 10/20
See application file for complete search history.

(56) References Cited

U.S. PATENT DOCUMENTS 9,350,461 B1 * 5/2016 Smith ..................... H04B 10/90
2004/0264958 A1 * 12/2004 Zoller .................... H04B 10/70
398/40

(Continued)

FOREIGN PATENT DOCUMENTS

CN        113126385 A  *  7/2021  ........... G02F 1/3501
WO    WO-2023058177 A1 *  4/2023

OTHER PUBLICATIONS

Kim et al., "Noise-Resistant Quantum Communications using HyperEntanglement", Dec. 2021, Optica, vol. 8 No. 12, pp. 1524-1531 (Year: 2021).*

(Continued)

*Primary Examiner* — Paulinho E Smith
(74) *Attorney, Agent, or Firm* — George Likourezos; Carter, DeLuca & Farrell LLP

(57) ABSTRACT

A system for noise-resistant quantum communication using hyperentanglement includes a quantum system that includes a plurality of qubits, a processor, and a memory. The memory includes instructions stored thereon, which, when executed by the processor, cause the quantum system to access a signal of a quantum system that includes a plurality of qubits and obtain hyperentanglement of the plurality of qubits via an entanglement source. The hyperentanglement (Continued)

of the plurality of qubits is in at least two dimensions, including a first dimension and a second dimension. The instructions, when executed, further cause the quantum system to transmit the hyperentangled plurality of qubits via a communication channel; perform a communication of the signal with the first dimension of the at least two dimensions; and filter results of the communicated signal based on the second dimension of the at least two dimensions.

12 Claims, 14 Drawing Sheets

(56) References Cited

U.S. PATENT DOCUMENTS

| | | | | |
|---|---|---|---|---|
| 2010/0079833 A1* | 4/2010 | Langford | ............ | G02F 1/3536 |
| | | | | 359/107 |
| 2012/0195597 A1* | 8/2012 | Malaney | ............... | H04W 12/10 |
| | | | | 398/115 |
| 2020/0409232 A1* | 12/2020 | Weiner | ...................... | G02F 3/00 |
| 2023/0129562 A1* | 4/2023 | Tran | ....................... | G06N 10/40 |
| | | | | 706/62 |
| 2024/0012309 A1* | 1/2024 | Weiner | ...................... | G01J 1/42 |

OTHER PUBLICATIONS

International Preliminary Report on Patentability issued by the International Bureau of WIPO in connection with International Application No. PCT/US2022/049512, dated May 2, 2024.

International Search Report and Written Opinion issued in International Application No. PCT/US2022/049512 dated Feb. 14, 2023, pp. 1-11.

* cited by examiner $$\iint d\omega_A d\omega_B f(\omega_A, \omega_B) | \omega_A, \omega_B \rangle$$

$$|\psi\rangle = \frac{1}{\sqrt{N}} \left( \sum_{n}^{N} |nn\rangle \right)$$

SYSTEMS AND METHODS FOR NOISE-RESISTANT QUANTUM COMMUNICATION USING HYPERENTANGLEMENT

CROSS-REFERENCE TO RELATED APPLICATION/CLAIM OF PRIORITY

This application is a national phase of International Application No. PCT/US2022/049512, filed Nov. 10, 2022, which claims the benefit of, and priority to, U.S. Provisional Patent Application No. 63/263,859, filed on Nov. 10, 2021, the entire contents of which are hereby incorporated herein by reference.

TECHNICAL FIELD

The present disclosure relates generally to the field of quantum information processing. More specifically, the present disclosure provides at least a system and method for noise-resistant quantum communication using hyperentanglement.

BACKGROUND

Harnessing entanglement between many particles is key to a quantum advantage in applications including sensing, metrology, and timekeeping, secure communication, and quantum computing. For example, entanglement distribution is a critically enabling feature of quantum key distribution, quantum teleportation, quantum secret sharing, quantum secure direct communication, and connecting quantum processing nodes. However, entanglement is a fragile resource prone to quickly degrade with noise, thus leading to the loss of quantum advantage Accordingly, there is interest in noise-resistant quantum communications.

SUMMARY

An aspect of the present disclosure provides a system for noise-resistant quantum communication using hyperentanglement. The system includes a quantum system, a processor, and a memory. The quantum system includes a plurality of qubits. The memory includes instructions stored thereon, which, when executed by the processor, cause the quantum system to access a signal of a quantum system and perform hyperentanglement of the plurality of qubits via an entanglement source. The hyperentanglement of the plurality of qubits is in at least two dimensions. The at least two dimensions include a first dimension and a second dimension. The instructions, when executed, further cause the quantum system to transmit the hyperentangled plurality of qubits via a communication channel; perform a communication of the signal with the first dimension of the at least two dimensions; and filter results of the communicated signal based on the second dimension of the at least two dimensions.

In accordance with aspects of the disclosure, the at least two dimensions may include at least two separate degrees of freedom.

In an aspect of the present disclosure, the at least two dimensions may include at least two of: polarization, frequency-time, energy-time, orbital angular momentum, time-bin, and/or position-momentum.

In another aspect of the present disclosure, the entanglement source may include spontaneous parametric down-conversion.

In yet another aspect of the present disclosure, the hyperentanglement may be performed by spontaneous parametric down-conversion via the entanglement source.

In accordance with further aspects of the present disclosure, the spontaneous parametric down-conversion may be performed by a periodically poled Lithium Niobate crystal pumped by a second harmonic of a picosecond mode-locked fiber laser.

In an aspect of the present disclosure, the qubits may include signal entangled photons, and wherein the instructions, when executed by the processor, further cause the quantum system to increase a number of signal-entangled photons transmitted without loss of quantum entanglement In an aspect of the present disclosure, the qubits include signal-entangled photons.

In another aspect of the present disclosure, the instructions, when executed by the processor, may further cause the quantum system to distinguish noise photons from the signal-entangled photons.

In yet another aspect of the present disclosure, the instructions, when executed by the processor, may further cause the quantum system to improve a signal-to-noise ratio of the communicated signal based on the filtered results.

In another aspect of the present disclosure, the instructions, when executed by the processor, may further cause the quantum system to communicate the signal.

An aspect of the present disclosure provides a method for noise-resistant quantum communication. The method includes accessing a signal of a quantum system that includes a plurality of qubits and performing hyperentanglement of the plurality of qubits via an entanglement source. The hyperentanglement is in at least two dimensions. The at least two dimensions include a first dimension and a second dimension. The method further includes transmitting the hyperentangled plurality of qubits via a communication channel, performing a communication of the signal with the first dimension of the at least two dimensions, filtering results of the communicated signal based on the second dimension of the at least two dimensions, and communicating the filtered results of the communicated signal.

In another aspect of the present disclosure, the two dimensions may include at least two separate degrees of freedom.

In yet another aspect of the present disclosure, the two dimensions may include at least two of: polarization, frequency-time, energy-time, orbital angular momentum, time-bin, or position-momentum.

In yet another aspect of the present disclosure, the entanglement source may include spontaneous parametric down-conversion.

In accordance with further aspects of the present disclosure, the hyperentanglement may be performed by spontaneous parametric down-conversion via the entanglement source.

In another aspect of the present disclosure, the spontaneous parametric down-conversion may be performed by a periodically poled Lithium Niobate crystal pumped by a second harmonic of a picosecond mode-locked fiber laser.

In yet another aspect of the present disclosure, the two dimensions may include polarization and frequency-time. The qubits may include polarization-frequency hyperentangled photon pairs. The method may further include discretizing a correlated spectra of the polarization-frequency hyperentangled photon pairs into a correlated frequency bin measurement and a correlated time-bin measurement and deterministically mapping the correlated frequency bin measurement to the correlated time-bin measurement.

In a further aspect of the present disclosure, the qubits may include signal-entangled photons. The method may further include distinguishing noise photons from signal-entangled photons.

In a further aspect of the present disclosure, the method may further include improving a signal-to-noise ratio based on the filtered results.

An aspect of the present disclosure provides a non-transitory computer-readable storage medium storing a program for causing a quantum system to execute a method for noise-resistant quantum communication. The method includes accessing a signal of a quantum system that includes a plurality of qubits and performing hyperentanglement of the plurality of qubits via an entanglement source. The hyperentanglement is in at least two dimensions. The at least two dimensions include a first dimension and a second dimension. The method further includes transmitting the hyperentangled plurality of qubits via a communication channel, performing a communication of the signal with the first dimension of the at least two dimensions, filtering results of the communicated signal based on the second dimension of the at least two dimensions, and communicating the filtered results of the communicated signal.

Further details and aspects of exemplary aspects of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which.

DETAILED DESCRIPTION

Figure 1:
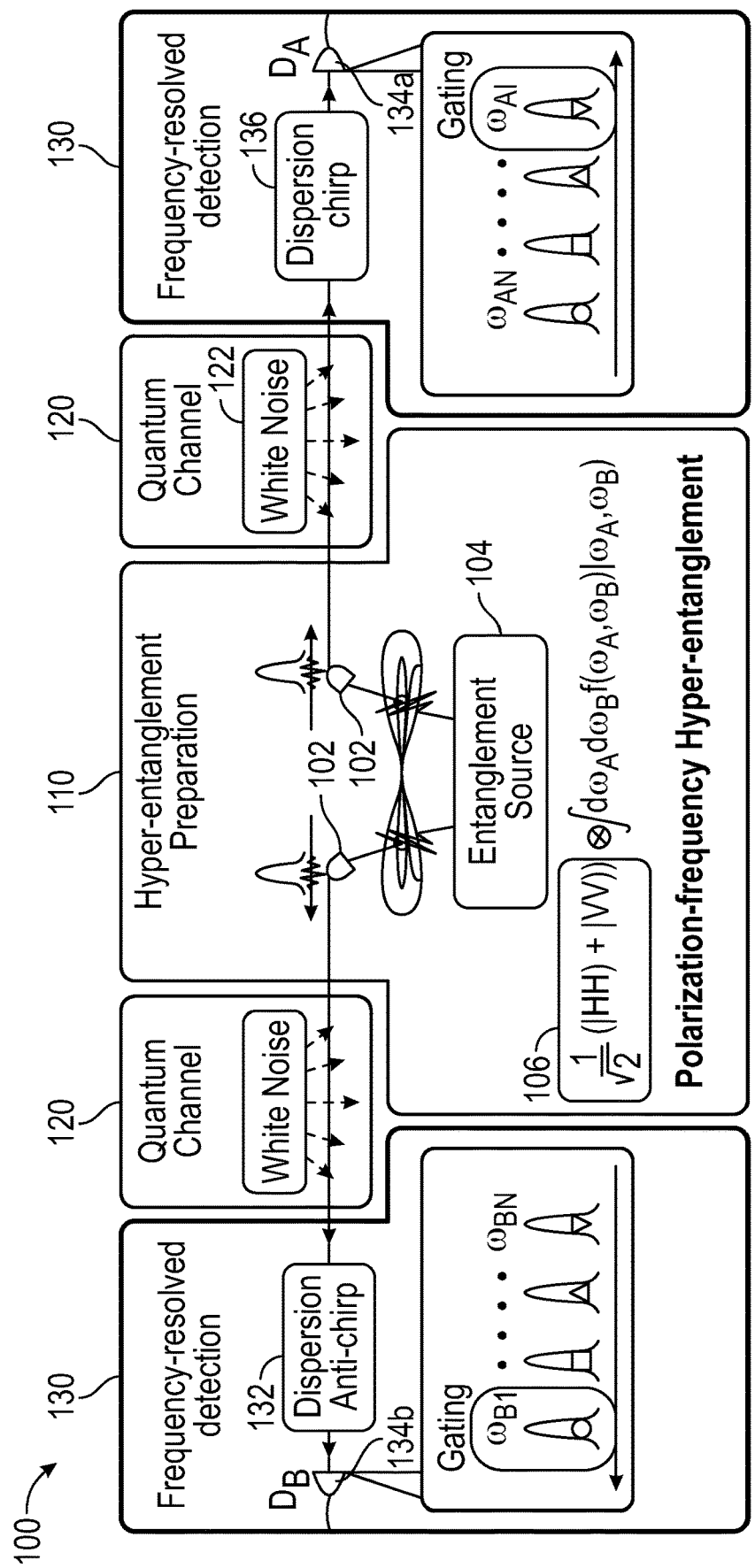
FIG. 1 is a diagram of an exemplary quantum system for quantum noise-resistant quantum communication using hyperentanglement, in accordance with examples of the present disclosure.

The present disclosure relates generally to the field of quantum operations. More specifically, the present disclosure provides at least a system and method for noise-resistant quantum communication using hyperentanglement.

Aspects of the present disclosure are described in detail with reference to the drawings wherein like reference numerals identify similar or identical elements.

Although the present disclosure will be described in terms of specific examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

Referring to FIG. 1, a diagram of an example quantum system 100 for noise-resistant communication using hyperentanglement is shown. The quantum system 100 may include two or more qubits 102 and an entanglement source 104. Qubits 102 may be arranged in a one- or more-dimensional system. For example, the qubits 102 may be grouped into hypercubic latices. Although qubit systems are used as an example, it is contemplated that the disclosed technology may be used in qudit systems (arbitrary finite-level systems) as well by utilizing energy-time hyper-entanglement of the two-photon state. Thus, the disclosed approach greatly improves the noise-resistant feature of qudit entanglement, far beyond what can be achieved naturally with entangled qudits alone. The disclosed systems and methods further have the advantage of providing a universally adoptable practical strategy to withstand noise, by several orders of magnitude, in quantum communication via noisy channels.

Distribution of quantum entanglement to two or more distant parties 134a, 134b is the essential operation that powers nearly all quantum information protocols, such as quantum key distribution, quantum teleportation, quantum secret sharing, quantum secure direct communication, deterministic secure quantum communication, and connecting quantum processing nodes. For the practical deployment of long-distance quantum communication protocols, the distribution of entanglement through noisy quantum channels remains a critical unsolved gap. The presence of noise within the quantum transmission channels, via free space or optical fibers, is nearly unavoidable as it can come from stray light, crosstalk of co-propagating signals, or can be generated by linear and nonlinear effects in the transmission medium itself. The effects of noise on a quantum state can be described by a few quantum error models. For example, after being transmitted through quantum channels with depolarizing noise, a perfectly-prepared entangled state, $|\phi^{(+)}\rangle = (|00\rangle + |11\rangle)/\sqrt{2}$, quickly degrades to a partially mixed state, $p=(1-p)|\phi^{(+)}\rangle \langle \phi^{(+)}| + p \mathbb{1}/4$, where $\mathbb{1}$ is the identity operator; quantum operations cease to be possible at $p > 2/3$ as there would be no entanglement shared between two distant quantum nodes.

The disclosed systems and methods enhance the ability of qubit-based quantum communication systems to withstand quantum state degradation within noisy channels in a practically deployable fashion via hyperentanglement.

Hyperentanglement refers to a multipartite quantum state that is simultaneously entangled in two or more separate degrees of freedom, e.g., position-momentum, energy-time, polarization, orbital angular momentum, time-bin, etc. Hyperentanglement may be used for demonstrating certain quantum information protocols, such as high-capacity encoding and super-dense teleportation. The disclosed systems and methods provide the benefit of not requiring a modification of the intrinsic quantum communication protocol under exam. Indeed, the disclosed noise-resistant systems and methods can be directly applicable to all qubit-based communication protocols. Instead, the disclosed systems and methods take advantage of the additional quantum correlation in a different Hilbert space to efficiently discriminate the signal photons from noise photons coming from other sources, resulting in several orders of magnitude enhancement of the signal-to-noise ratio (SNR). The disclosed hyperentanglement-based protocol enables an extremely robust distribution of polarization-entangled photons even in the presence of strong noise that would otherwise preclude quantum operations due to noise-induced entanglement sudden death. The disclosed systems and methods are generally applicable to a wide-ranging set of quantum communication protocols under current development.

Figure 2:
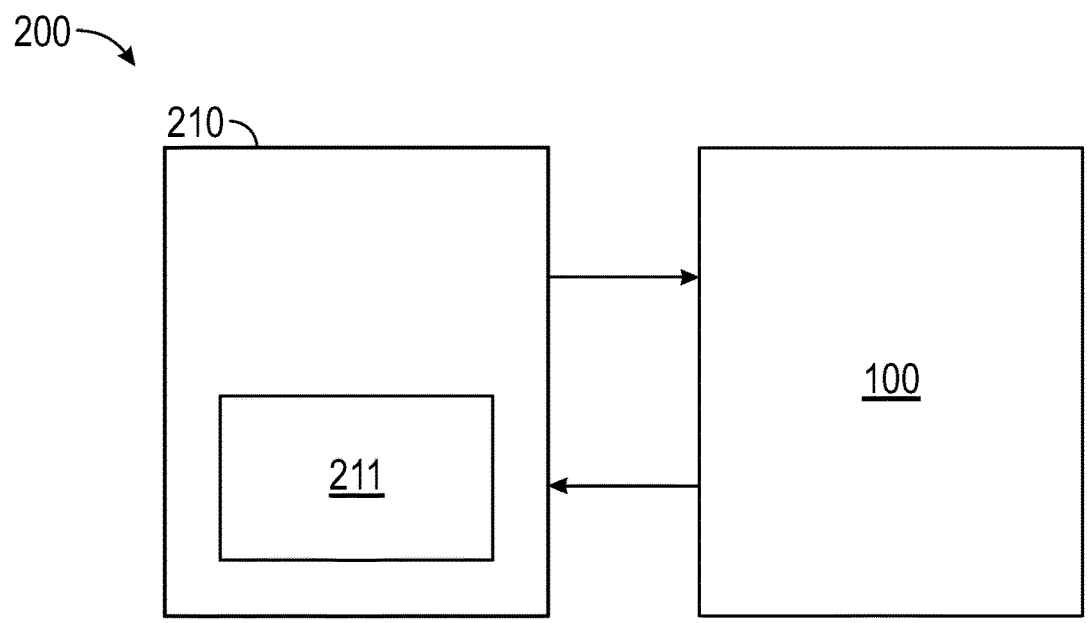
FIG. 2 is a schematic diagram of an exemplary processing system diagram for use with the system of FIG. 1, in accordance with examples of the present disclosure.

Referring to FIG. 2, an illustrative schematic for noise-resistant quantum communication for the quantum system 100 of FIG. 1 is shown. The system 200 for noise-resistant quantum communication may include a processor 210 (FIG. 2) and a memory 211, including instructions stored thereon, which, when executed by the processor 210, cause the quantum system 100 to perform the steps of method 500 of FIG. 5.

The processor 210 may be connected to a computer-readable storage medium or a memory 211. The computer-readable storage medium or memory 211 may be a volatile type of memory, e.g., RAM, or a non-volatile type of memory, e.g., flash media, disk media, etc. In various aspects of the disclosure, the processor 210 may be any type of processor such as a quantum processor, a digital signal processor, a microprocessor, an ASIC, a graphics processing unit (GPU), a field-programmable gate array (FPGA), or a central processing unit (CPU).

In aspects of the disclosure, the memory 211 can be a quantum memory, random access memory, read-only memory, magnetic disk memory, solid-state memory, optical disc memory, and/or another type of memory. In some aspects of the disclosure, the memory 211 can be separate from the processor and can communicate with the processor through communication buses of a circuit board and/or through communication cables such as serial ATA cables or other types of cables. The memory 211 includes computer-readable instructions that are executable by the processor 210 to operate the processor. In other aspects of the disclosure, the system 200 may include a network interface to communicate with other computers or to a server. A storage device may be used for storing data.

Figure 5:
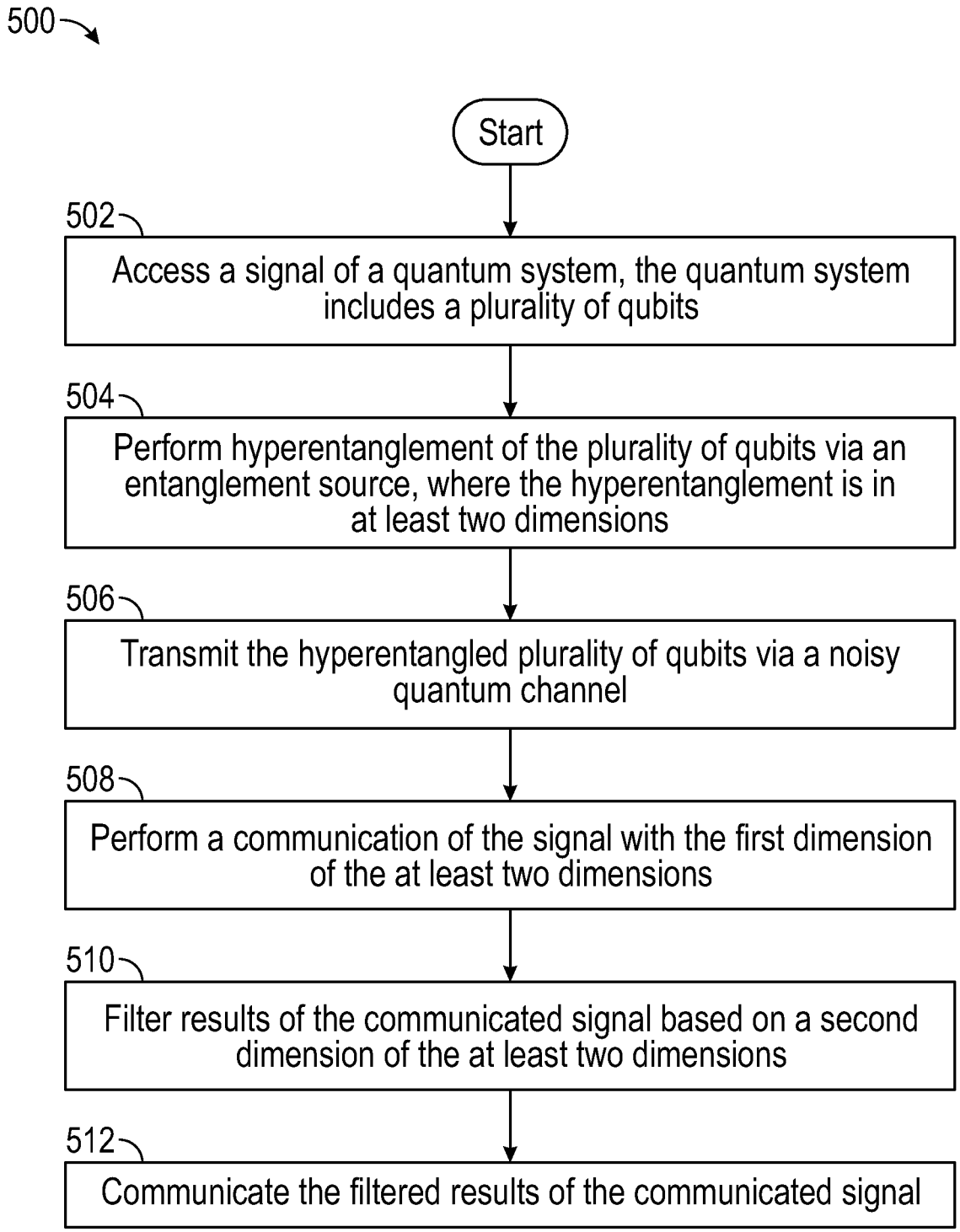
FIG. 5 is a diagram of a method for noise-resistant quantum communication for the quantum system of FIG. 1, in accordance with examples of the present disclosure.

Referring to FIG. 5, a method 500 for noise-resistant quantum communication for the quantum system of FIG. 1 is shown. The system 200 for noise-resistant quantum communication may include a processor and a memory, including instructions stored thereon, which when executed by the processor 210, cause the quantum system 200 to perform the steps of method 500.

Initially, at step 502, the processor 210 accesses a signal of a quantum system 100 that includes a plurality of qubits 102. For example, the qubits 102 may include a pair of photons.

Next, at step 504, the processor 210 performs hyperentanglement of the plurality of qubits via the entanglement source 104 (FIG. 1). The hyperentanglement of the qubits 102 is in at least two dimensions, for example, polarization, frequency-time, energy-time, orbital angular momentum, time-bin, and/or position-momentum. The at least two dimensions may include a first dimension and a second dimension. The at least two dimensions may include at least two separate degrees of freedom. In aspects, the processor 210 may encode the second degree of freedom.

For example, the qubits 102 (e.g., a pair of photons) may be hyperentangled 110 in polarization and frequency-time degrees of freedom.

Figure 3A:
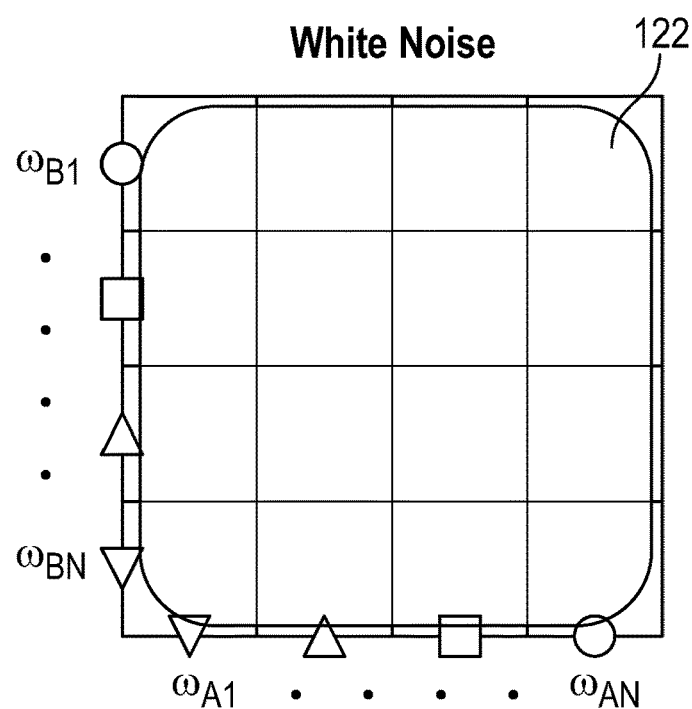
FIG. 3A is a diagram illustrating an N×N matrix of a noisy communication channel of the system of FIG. 1, in accordance with examples of the present disclosure.
Figure 3B:
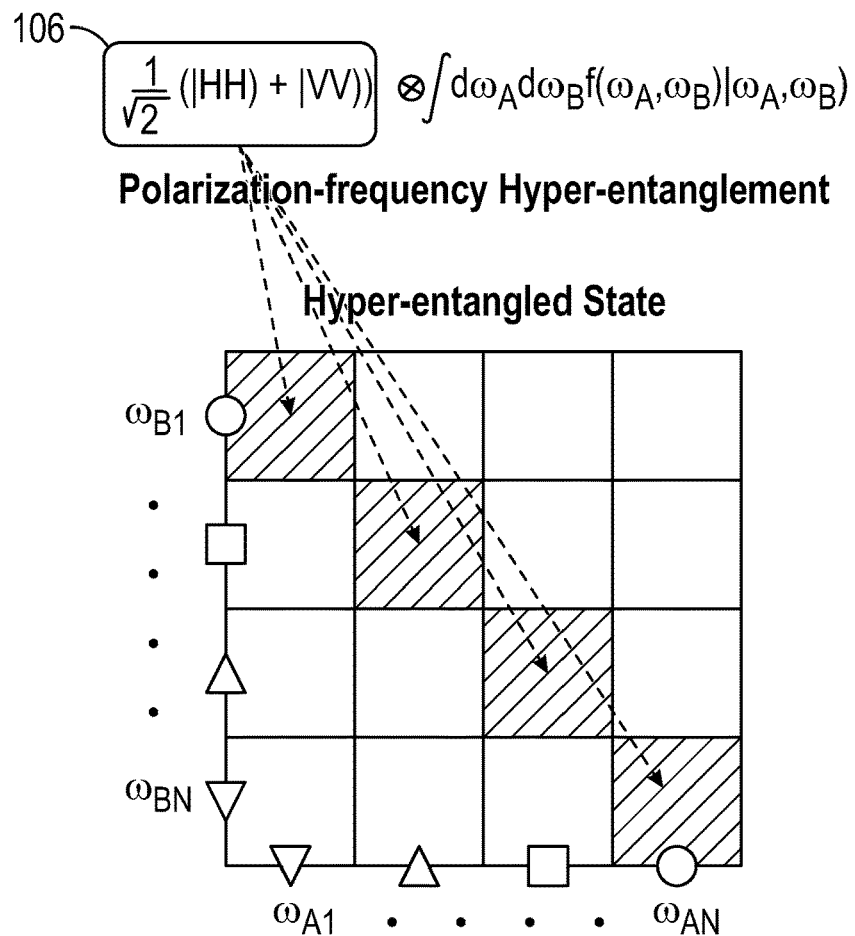
FIG. 3B is a diagram illustrating an N×N matrix showing hyperentangled qubits of the system of FIG. 1, in accordance with examples of the present disclosure.

The entanglement source 104 may include spontaneous parametric down-conversion (SPDC). For example, the SPDC may be performed by a periodically poled Lithium Niobate (PPLN) crystal pumped by a second harmonic of a picosecond mode-locked fiber laser. For example, SPDC may be used to produce two-photon states hyperentangled in polarization (i.e., the first dimension) and frequency-time (i.e., the second dimension) (FIG. 3B). The polarization degree of freedom constitutes the qubit. The goal of the protocol is to distribute a pair of entangled qubits 102 even via highly noisy quantum channels while maintaining high SNR by using the frequency-time entanglement of the two qubits 102 (e.g., a photon pair), simultaneously present with the polarization entanglement (FIG. 3B).

Next, at step 506, the processor 210 transmits the hyper-entangled plurality of qubits via a communication channel 120. The communication channel 120 may include, for example a fiber and/or free space. Other communication channels are contemplated to be within the scope of the disclosure. The qubits 102 may be prepared and sent to two distant parties 134a, 134b via a communication channel 120 (e.g., optical fibers), where white noise 122 is introduced (e.g., noisy quantum channels) (FIG. 1 and FIG. 3A).

Next, at step 508, the processor 210 performs a communication of the signal with the first dimension (e.g., polarization) of the at least two dimensions.

Next, at step 510, the processor 210 filters results of the communication based on the second dimension (e.g., frequency-time) of the at least two dimensions.

Note that, in a traditional protocol without utilizing hyper-entanglement, the detection module cannot distinguish signal entangled photons from noise photons, hence, at the constant signal, the SNR degrades with the number of noise photons. For example, before being detected, the two qubits 102 (e.g., the pair of photons) of the quantum system 100 may go through dispersive stages (FIG. 1), acquiring chirp 136 and anti-chirp 132, respectively. The frequency-anticorrelation property of the SPDC photons makes possible the lossless conversion of the correlated frequency-bins to the correlated time-bins via dispersive media, enabling frequency-selective detection of photons based on the time of arrival measurements. The two qubits 102 that are anti-correlated in frequency will result in equal time coincidence clicks, while the noise photons 122 with no frequency relation will elicit clicks at random time differences.

Figure 3C:
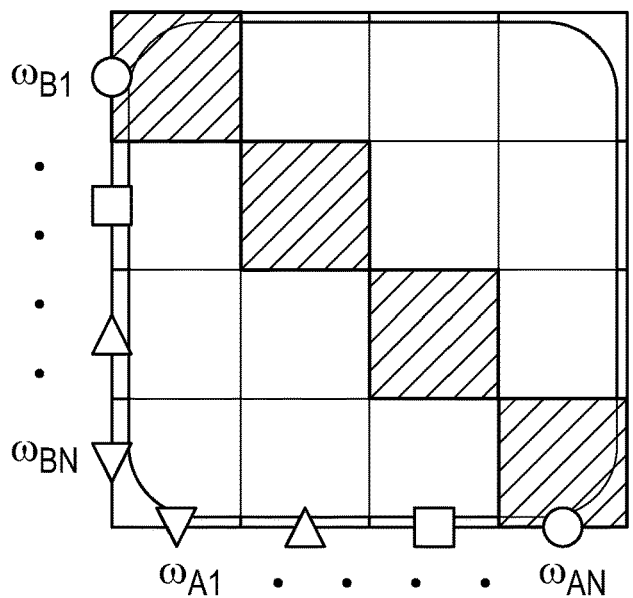
FIG. 3C is a diagram illustrating an N×N matrix showing frequency-resolved detection of the qubits of the system of FIG. 1, in accordance with examples of the present disclosure.

To better visualize the noise-resistant property provided by the protocol, detection may be divided in N frequency bins per detection station. The coincidence counting may be represented as an N×N matrix featuring all possible frequency-bin combinations. The polarization-entangled photons (i.e., qubits 102), further endowed with frequency-anticorrelation due to hyperentanglement, will spread along the one-dimensional diagonal of the matrix, while the noise photons will evenly spread across the whole two-dimensional plane (FIGS. 3A-C). Thus, while the signal remains constant as it is fully captured in the diagonal elements, the noise is randomly and uniformly distributed in the two-dimensional plane, and is hence reduced by $N/N^2$.

Thus, frequency-resolved detection (FIG. 3C) via gated coincidence measurement enables effective rejection of all off-diagonal white noise in the matrix and, therefore, compared to ordinary quantum communication protocols relying on the direct distribution of polarization entanglement, the disclosed protocol relying on polarization/frequency hyperentanglement gives rise to an N scaling advantage in SNR, making possible noise-resistant quantum communication.

The effects of the quantum noise on a pure maximally entangled state can be described by mixing the entangled state with a white noise state. The noisy polarization-frequency hyperentangled quantum state $\rho_h$ may be described as:

$$\rho_h = (1-p)|\phi^{(+)}\rangle\langle\phi^{(+)}| \otimes |\psi\rangle\langle\psi| + \frac{p}{4N^2} \mathbb{1}_{pol} \otimes \mathbb{1}_{freq}, \quad \text{(Eqn. 1)}$$

where p ($0 \leq p \leq 1$) is the noise portion, $$|\phi^{(+)}\rangle = \frac{1}{\sqrt{2}}(|HH\rangle + |VV\rangle), \text{ and } |\psi\rangle = \sum_{n=1}^{N} \frac{1}{\sqrt{N}} |n\rangle_1 |n\rangle_2$$

is the N-dimensional frequency entangled state. The identity operators $\mathbb{1}_{pol}$ and $\mathbb{1}_{freq}$ denote, respectively, the white noise states in the polarization and in the frequency degrees of freedom. Here, $4N^2$ represents the dimensional normalization for the white noise term. From Eqn. 1, first, define the critical noise portion $p_c$ at which the two-qubit state has no polarization entanglement and, by using the separability criterion for a density matrix, it is found to be $p_c=2N/(1+2N)$. Note that, if $p_c<r1$, the phenomenon is known as entanglement sudden death. As the critical noise portion approaches one with a large N, the distribution of polarization entanglement becomes more robust to noise. Additionally, for the noisy entangled state in Eqn. 1, SNR is found to be:

$$SNR = \frac{2N(1-p)}{p}. \quad \text{(Eqn. 2)}$$

Note that, at $p=p_c$, SNR becomes unity regardless of the dimension N. The noisy entangled state in Eqn. 1 has non-zero entanglement if the measured SNR value exceeds one.

Next, at step 512, the processor 210 communicates via the filtered results.

Figure 4:
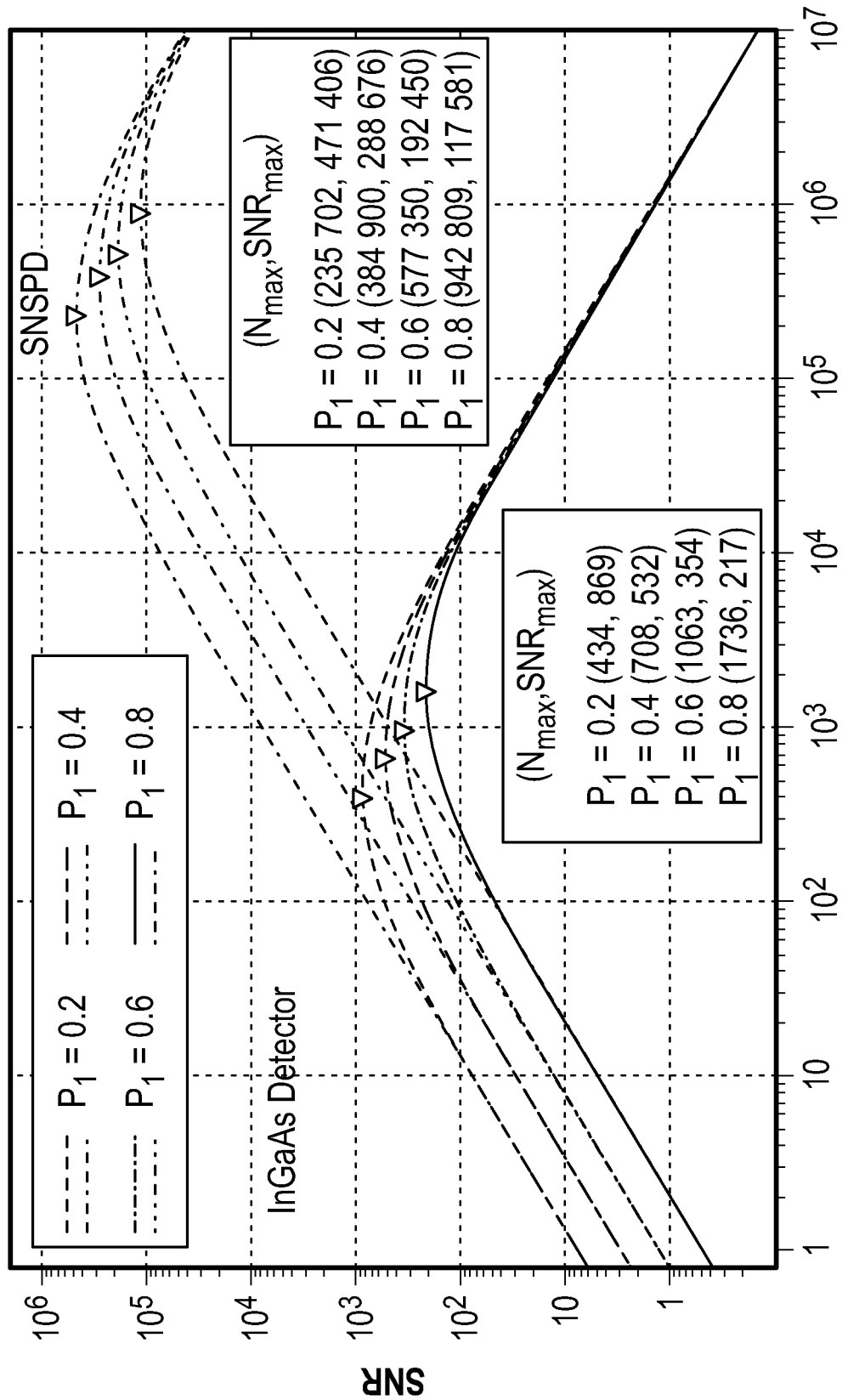
FIG. 4 is a diagram illustrating the signal-to-noise ratio for entanglement distribution via noisy quantum channels of the system of FIG. 1, in accordance with examples of the present disclosure.

The SPDC photons may be frequency-binned into N channels such that, for each channel, the channel efficiency (including the overall quantum channel transmission efficiency $\alpha_{ch}$ and the detector efficiency $\alpha_d$) is $\alpha=\alpha_{ch}\alpha_d$, the dark count probability (per gate pulse) of a detector is d, and the detection probability (per gate pulse) of the background noise is b. If the average number of SPDC photon pairs per pulse is $\mu$, the expression for the SNR is given as:

$$SNR = \frac{\mu\alpha^2}{2N\left(\frac{\mu}{2N}\alpha + d + \frac{b}{2N}\right)^2}, \quad \text{(Eqn. 3)}$$

where it is assumed for simplicity that all N channels have identical properties. As the frequency-resolved detection 130 (FIG. 1) for the N correlated frequency-bins is made possible by converting them into N correlated time-bins, a detector having a faster rise time would enable tighter frequency-resolved detection. For the simulation, assume a rather weak SPDC process, $\mu=0.02$, and the overall quantum channel efficiency of $\alpha_{ch}=0.5$ for each photon. Considering typical parameters of an InGaAs detector ($d=6\times10^{-6}$ and $\alpha_d=0.15$) and an SNSPD ($d=6\times10^{-8}$ and $\alpha_d=0.8$) at the telecom wavelength, the numerical simulation of Eqn. 3 shown in FIG. 4 confirms that the white noise subtraction becomes more prominent as N is increased. It is important to point out that SNRs reach different maximum values and decrease with increasing N due to the contributions of the dark counts, as shown in FIG. 4. Clearly, there is an optimum value of N which maximizes SNR for a given initial noise portion $p_1$ and the detector properties. The numerical simulation of Eqn. 3 clearly demonstrates that even for highly noisy quantum channels represented by a large initial noise portion $p_1$, high SNR entanglement distribution is possible by choosing a suitable correlated time-bin division N. In particular, FIG. 4 demonstrates up to three orders of magnitude SNR improvement for traditional InGaAs detectors and up to nearly six orders of magnitude SNR improvement for SNSPDs.

Figure 6:
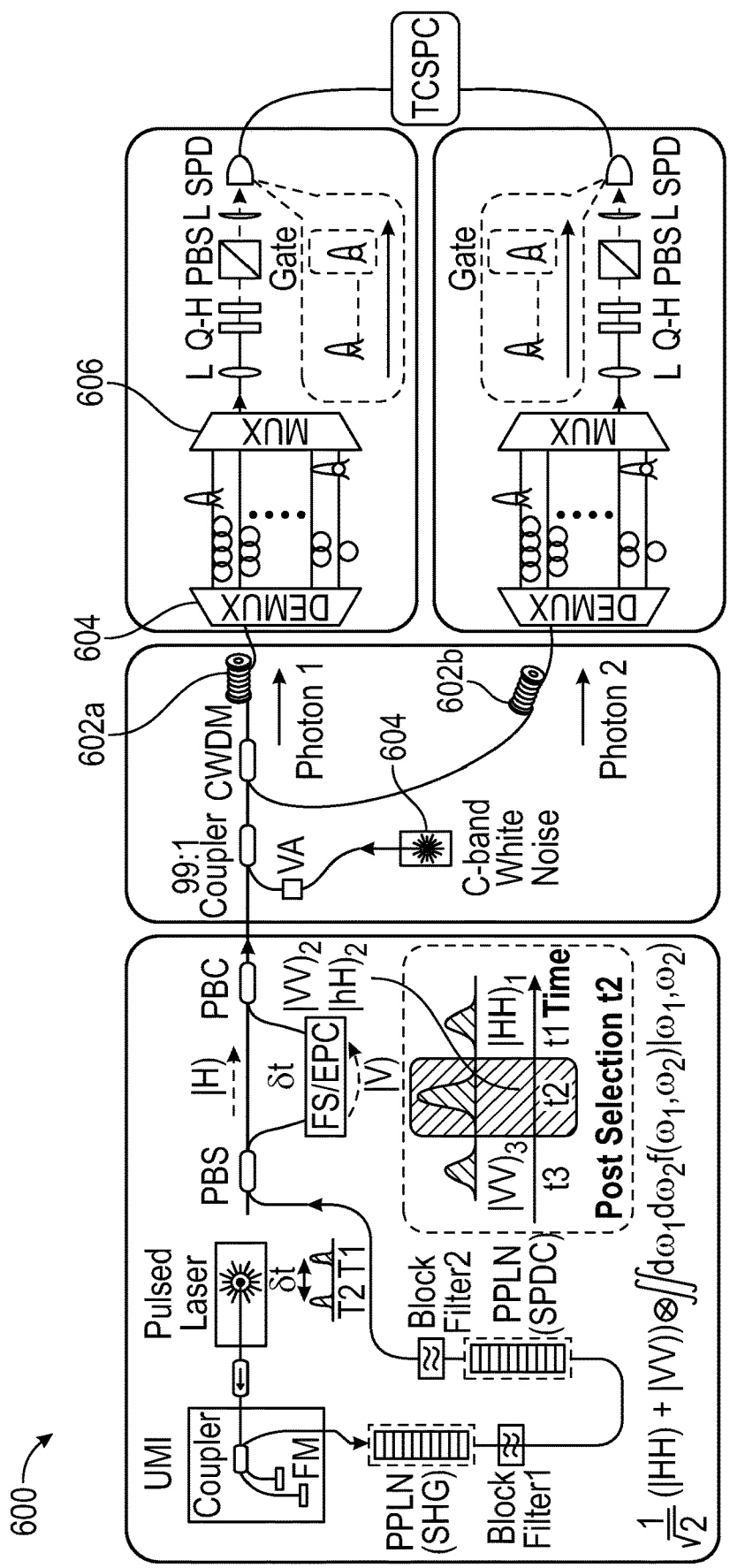
FIG. 6 is a diagram of an exemplary fiberoptic-based quantum system for noise-resistant quantum communication using hyperentanglement, in accordance with examples of the present disclosure.

Referring to FIG. 6, an example of the system 600 based on a fiber-optic setup is shown. The disclosed systems and methods provide an SNR improvement in quantum communication even in the presence of strong noise that would otherwise cause entanglement sudden death. To prepare polarization-frequency hyperentanglement of two photons in telecom wavelength, the type-0 SPDC process in a PPLN crystal pumped by the second harmonic of a picosecond mode-locked fiber laser is used. While frequency entanglement of the photon pair is naturally provided by the SPDC process, to prepare the polarization-entangled state, an unbalanced Michelson interferometer (UMI) may be used for the pump pulse, and a phase-stabilized unbalanced polarization Mach-Zehnder interferometer for the SPDC photons. The polarization-frequency hyperentangled state of the photon pair is then given as:

$$\frac{1}{\sqrt{2}}(|HH\rangle + |VV\rangle) \otimes \int d\omega_1 d\omega_2 f(\omega_1, \omega_2) |\omega_1, \omega_2\rangle, \quad \text{(Eqn. 4)}$$

where $f(\omega_1, \omega_2)$ is the joint spectral amplitude of the two-photon state, exhibiting frequency anti-correlation between the qubits (two photons 602a and 602b). The full spectral bandwidth $|f(\omega_1, \omega_2)|^2$ of the SPDC photons is roughly 80 nm at full width at half maximum centered at 1,552.52 nm. Approximately 10 nm flap-top regions of the spectral bandwidth for the frequency-entangled photons are used for photon 1 602a, the central wavelength is $\lambda_1$=1, 545.32 nm and the bandwidth is about $\delta\lambda_1$=9.56 nm. For photon 2 602b, the central wavelength is about $\lambda_2$=1,559.79 nm and the bandwidth is about $\delta\lambda_2$=9.74 nm. To test the noise-resistant feature of the protocol, white noise may be introduced to the entangled state so that the state in Eqn. 1 can be prepared. In aspects, a broadband telecom C-band light source 602 may be used, which is bandwidth-matched to those of photon 1 and photon 2. The attenuated white noise is then introduced to the fiber optic channel via a 99:1 coupler. The noise portion in Eqn. 1 may be measured in experiment as the ratio of the rate of noise counts and the rate of total counts at a detector.

At the heart of the protocol is to discretize the correlated spectra of the polarization-frequency hyperentangled photon pairs and to deterministically map the correlated frequency bin measurement to the correlated time-bin measurement. If photon 1 602a and photon 2 602b spectra are each discretized into N bins, the quantum state in Eqn. 4 can be written as:

$$\frac{1}{\sqrt{2}}(|HH\rangle + |VV\rangle) \otimes \sum_{n=1}^{N} \frac{1}{\sqrt{N}} |n\rangle_1 |n\rangle_2, \quad \text{(Eqn. 5)}$$

where N is the total number of frequency bins and $|n_1\rangle |n\rangle_2$ refers to the quantum state of the correlated frequency bin n for photon 1 and photon 2. Instead of using dispersive chirp 136 and anti-chirp 132 media as shown in FIG. 1 for frequency-bin to time-bin mapping, readily available dense wavelength division multiplexing (DWDM) components in the telecom band may be used. By using a demultiplexer 604 (DEMUX), the available single-photon spectra may be divided into up to six spectral channels, each with a full width at half maximum (FWHM) bandwidth of about 1.2 nm and a channel spacing of about 1.6 nm. The six DEMUX 604 output channels are connected to optical fibers of different lengths and fiber polarization controllers. The six DEMUX 604 output channels are then recombined into a single-mode optical fiber by using a multiplexer 606 (MUX). The frequency-bin separation of 1.6 nm thus is converted into the time-bin separation of 2.5 ns. Therefore, the joint spectrum analysis for photon 1 602a (spectral range between about 1,540.56 nm and about 1,550.12 nm) and photon 2 602b (spectral range between 1,554.94 nm and 1,564.67 nm) may be performed by measuring the 6×6 temporal correlation in the photons' arrival times at the InGaAs detectors using a coincidence counting device. Measurement of the polarization qubits can be done, for each correlated time-bin, by using the standard polarization qubit analysis technique with a half-wave plate, a quarter-wave plate, and a polarizing beam splitter. For the correlated time-bin measurement, the detector's gate window is set at about 1.5 ns. From the measurement, the 6×6 matrix, which represents the frequency-bin entanglement, is reconstructed, and each correlated frequency-bin represents a probability amplitude of a polarization-entangled photon pair (FIG. 3C). The 6×6 correlated frequency bins may be summed up to study the effect of more coarse frequency binning, e.g., 2×2 and 3×3, to the SNR.

Figure 7:
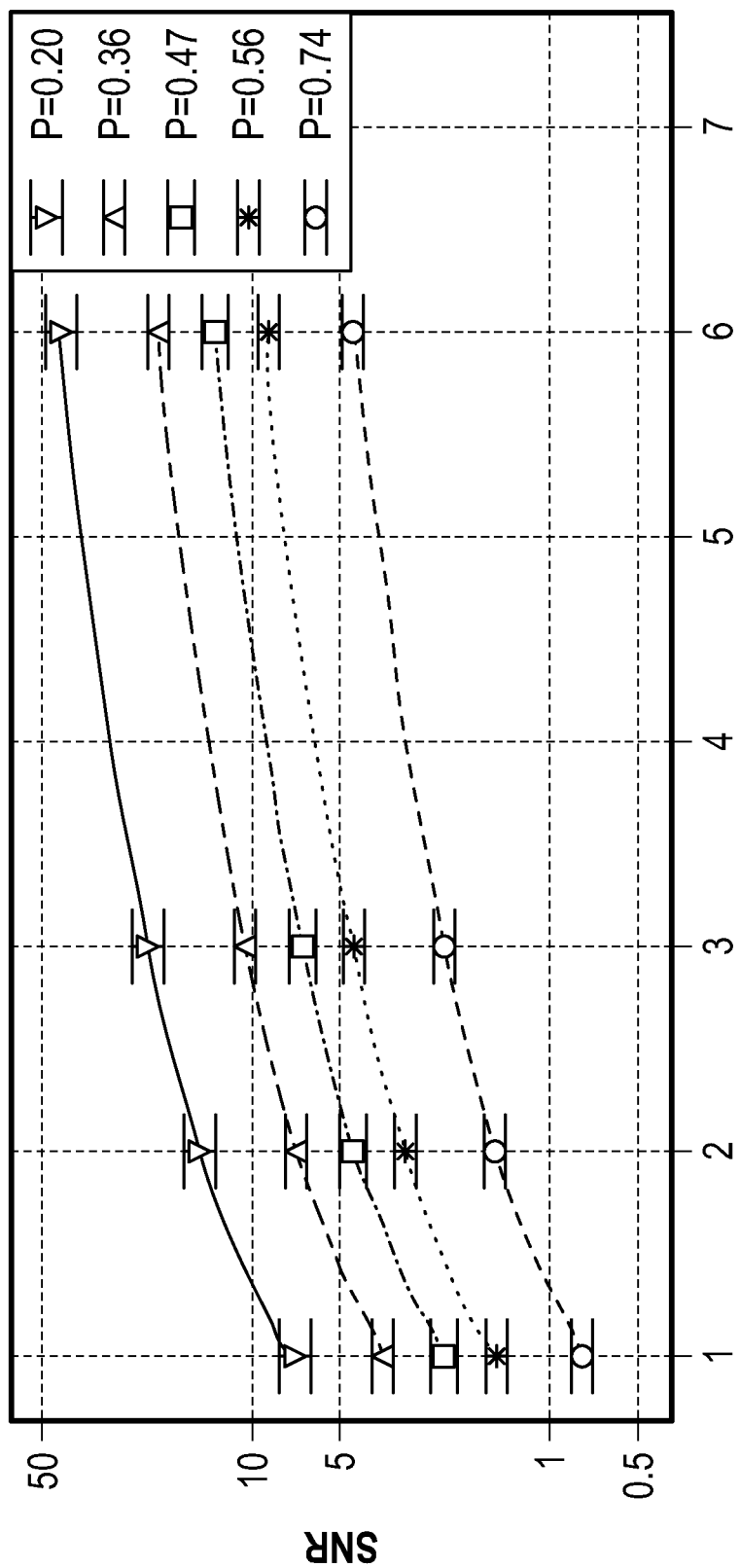
FIG. 7 is a diagram illustrating the signal-to-noise ratio for the system of FIG. 6, in accordance with examples of the present disclosure.

Referring to FIG. 7, example SNR measurement data for the system 600 of FIG. 6 is shown. If the channel-induced noise portion p is high, tighter frequency-resolved detection, i.e., larger N, helps to increase SNR for polarization entanglement distribution. The error bars represent one standard deviation. The solid lines are due to the SNR equation in Eqn. 2.

Figure 8:
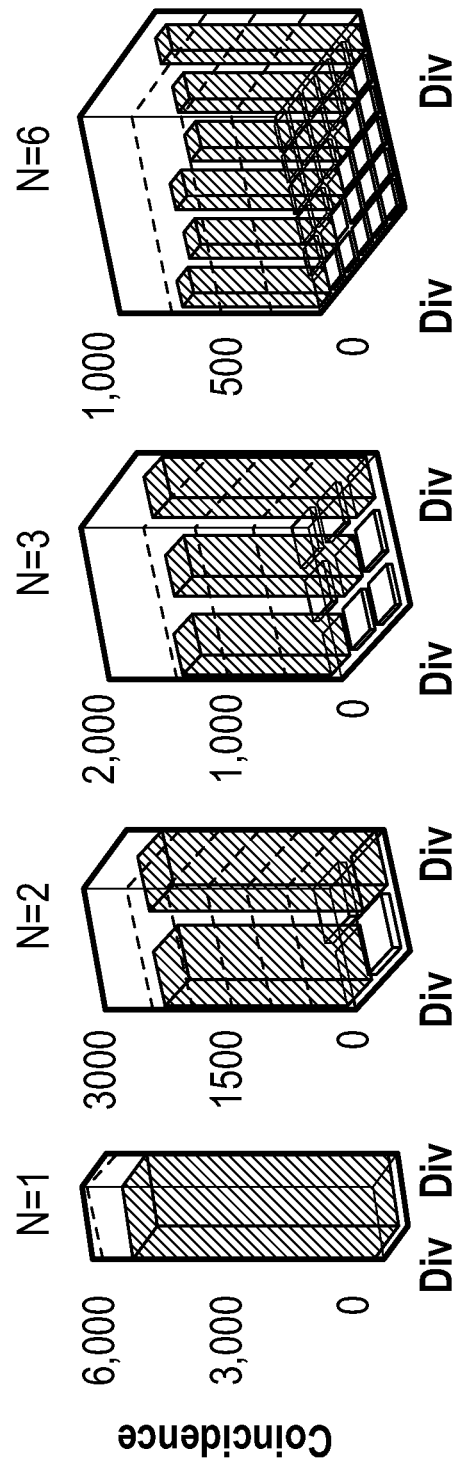
FIGS. 8 and 9 are diagrams illustrating N×N measurement matrices for the system of FIG. 6, in accordance with examples of the present disclosure.
Figure 9:
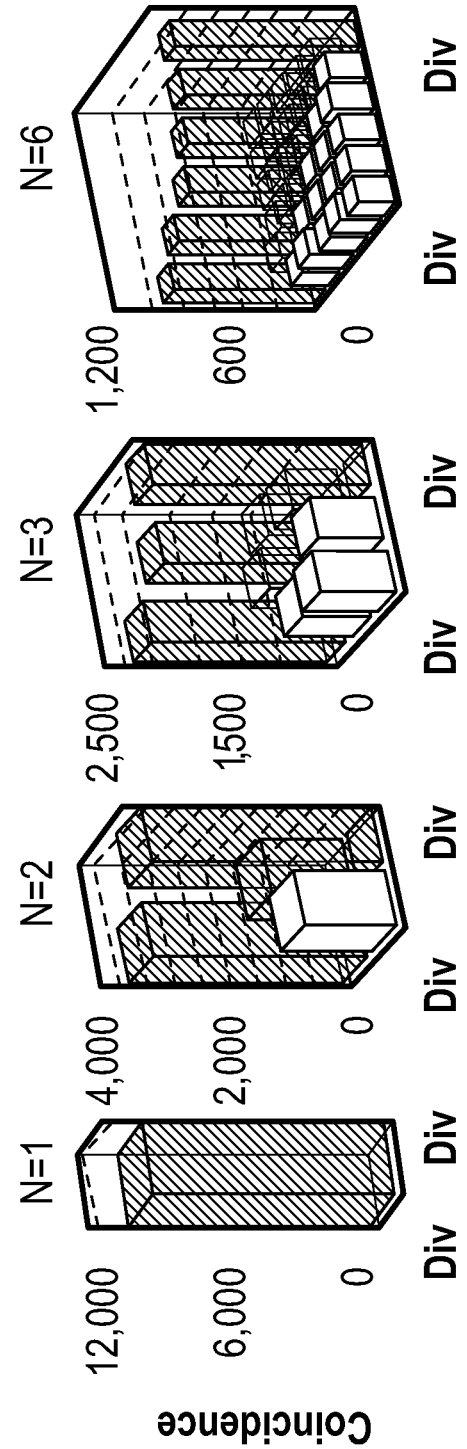

Referring to FIGS. 7-9, the experimental SNR measurements for the polarization entanglement distribution via noisy channels with hyperentangled discretized frequency-bin entanglement are shown. For a given value of the noise portion p, determine the experimental SNR values as a function of the number of frequency bins N. The noise portion p is determined from the ratio of the coincidence rate due to the noise only to that due to both the signal and the noise. The SNR measurements are performed on the computational basis, i.e., $|HH\rangle$ and $|VV\rangle$. It is clear from FIG. 7 that the disclosed systems and methods improve the SNR quite significantly, even with a strong noise in the quantum channels, by introducing more frequency bins.

Referring to FIGS. 8 and 9, the N×N measurement matrices are shown for the noise portion p=0.2 (FIG. 8) and for the noise portion p=0.74 (FIG. 9). Measurement outcomes due to polarization-entangled photons are distributed only along the diagonal while those of the noise are distributed uniformly across the matrix. The data is accumulated for about 90 seconds. The N×N measurement matrices reveal the effect of N-binning detection (i.e., frequency binning) to the SNR for different values of the noise portion p. Note that for N=1, the system is incapable of discriminating the signal and the noise photons, while for N=2, 3, and 6, the off-diagonal matrix elements are clearly identifiable as noise. Thus, the diagonal elements deal with significantly reduced noise. Due to the frequency entanglement of the photon pair (simultaneously present with the polarization entanglement), the signal events are distributed along the diagonal of the N×N matrix, while the white noise is distributed evenly. Thus, by using a larger N, it becomes possible to significantly improve the SNR in distributing polarization entanglement even with a strong noise in the quantum channel.

Next, the quality of polarization entanglement distributed to the two distant parties 134a, 134b via noisy quantum channels by varying the noise portion p and the number of frequency bins N is studied. First, for a given value of the noise portion p, the two-qubit polarization state is fully characterized with quantum state tomography (QST) for N=1, 2, 3 and 6. The two-qubit density matrix p obtained from QST is then used to evaluate the linear entropy $$S_L = \frac{4}{3}(1 - Tr[\rho^2])$$

and the concurrence C(ρ) of the two-qubit state. The linear entropy for a two-qubit state ranges from zero for the case of a pure state to 1 for a maximally-mixed state.

Figure 10:
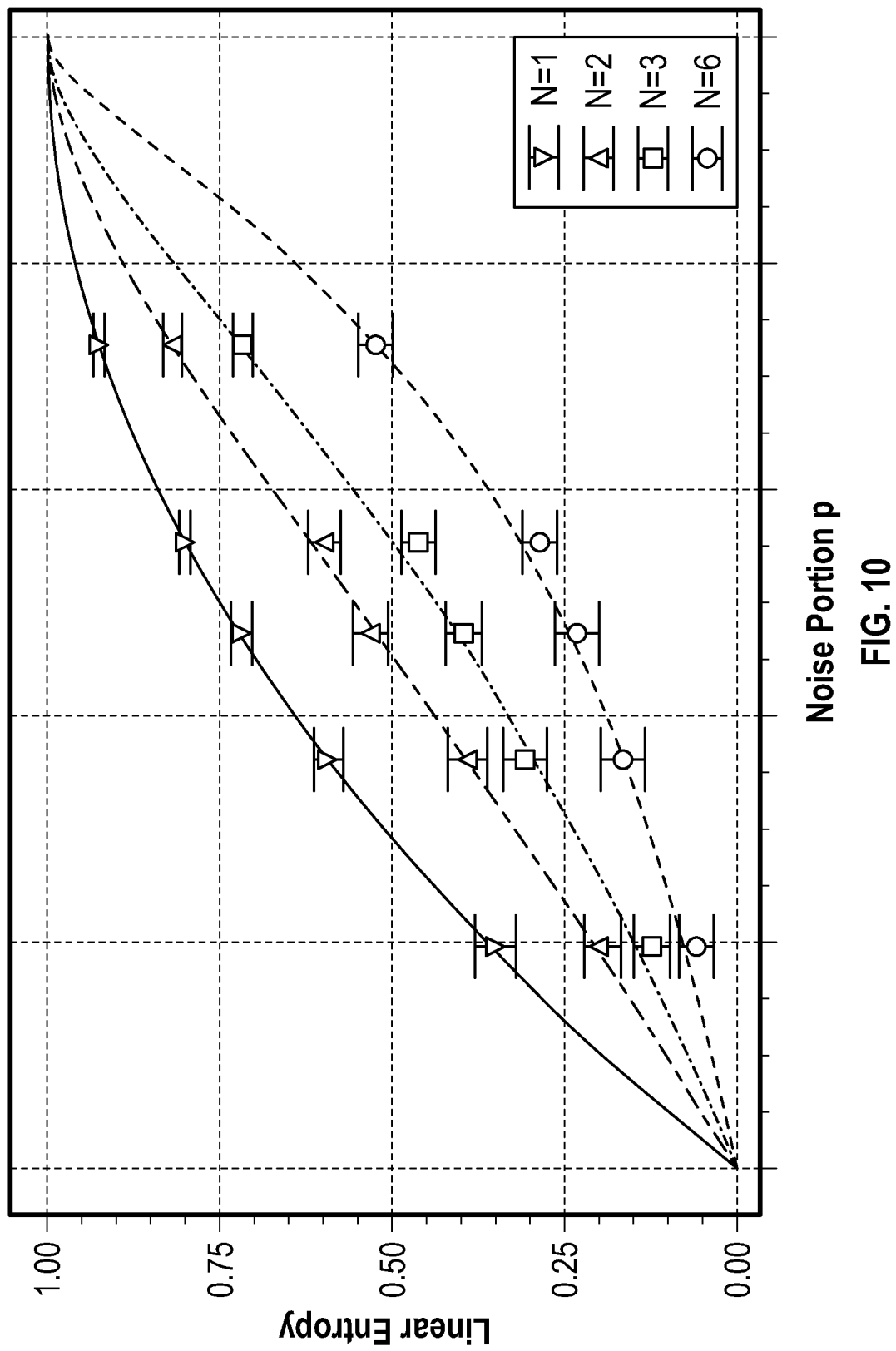
FIG. 10 is a diagram illustrating a noise-resistant distribution of polarization entanglement using polarization-frequency hyper-entanglement for the system of FIG. 1, where the distributed two-qubit state exhibits significantly decreased linear entropy, in accordance with examples of the present disclosure.
Figure 11:
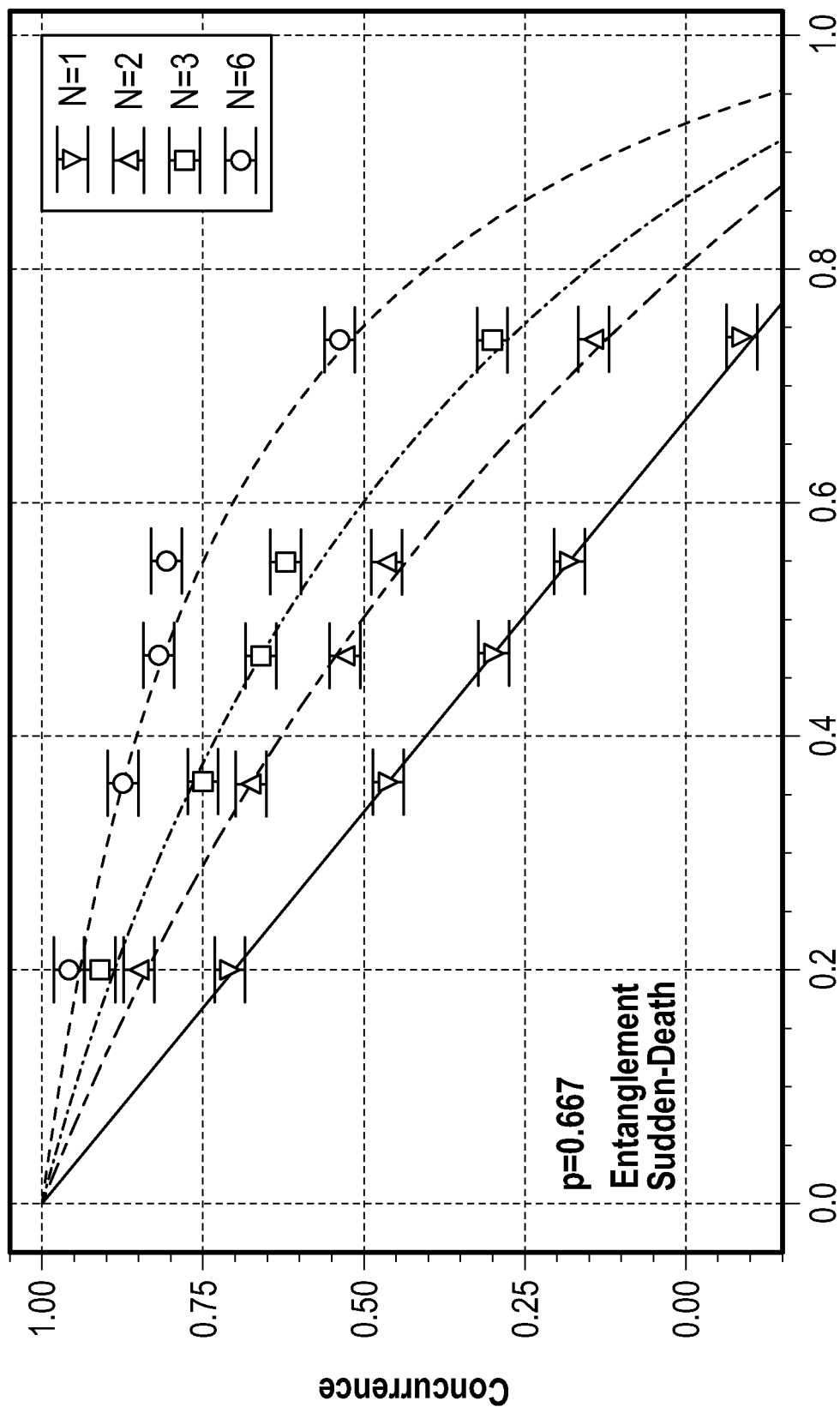
FIG. 11 is a diagram illustrating the noise-resistant distribution of polarization entanglement using polarization-frequency hyper-entanglement for the system of FIG. 1, where the distributed two-qubit state exhibits dramatically increased concurrence, in accordance with examples of the present disclosure.

Referring to FIGS. 10 and 11, diagrams illustrating the noise-resistant distribution of polarization entanglement using polarization-frequency hyper-entanglement are shown. Due to the N-binning detection (i.e., frequency-binning), even for a large noise portion p, the distributed two-qubit state exhibits significantly decreased linear entropy (FIG. 10) and dramatically increased concurrence (FIG. 11). Note that for p≥0.667, entanglement sudden death occurs as evidenced in the concurrence for N=1 (i.e., $p_c = \frac{2}{3}$ at N=1). N-binning detection enables entanglement distribution even via highly noisy quantum channels. The solid lines represent the theoretical curves from the mixed two-qubit entanglement model. The error bars represent one standard deviation. The dashed lines and the data point below zero are due to $\lambda_1 - \lambda_2 - \lambda_3 - \lambda_4$.

FIG. 11 shows the concurrence C(ρ) evaluated from the QST-reconstructed two-qubit density matrix ρ as the noise portion p is increased. Concurrence ranges from zero (i.e., no entanglement) to 1 (i.e., the Bell state) and is defined as C(ρ)=max(0,$\lambda_1 - \lambda_2 - \lambda_3 - \lambda_4$) where $A_i$ are the eigenvalues of the Hermitian matrix defined from ρ. Naturally, as p is increased, the concurrence of the two-qubit polarization state ρ is decreased. However, by using a larger N, concurrence between the two polarization qubits distributed to the two distant parties 134a, 134b is dramatically increased. It is interesting to note that when N=1 (the case of the ordinary detection method without relying on polarization-frequency hyperentanglement), entanglement sudden death occurs when p=0.667. (In FIG. 11, the dashed lines and the data point below the zero-concurrence value are due to $\lambda_1 - \lambda_2 - \lambda_3 - \lambda_4$. Physically, it means that there is no entanglement.) Remarkably, even in the case where noise is strong enough so that entanglement sudden death would make distribution of two-qubit polarization entanglement impossible, by using polarization-frequency hyperentanglement and frequency-binning with a larger N, non-zero entanglement to the two distant parties 134a, 134b may be distributed.

Figure 12:
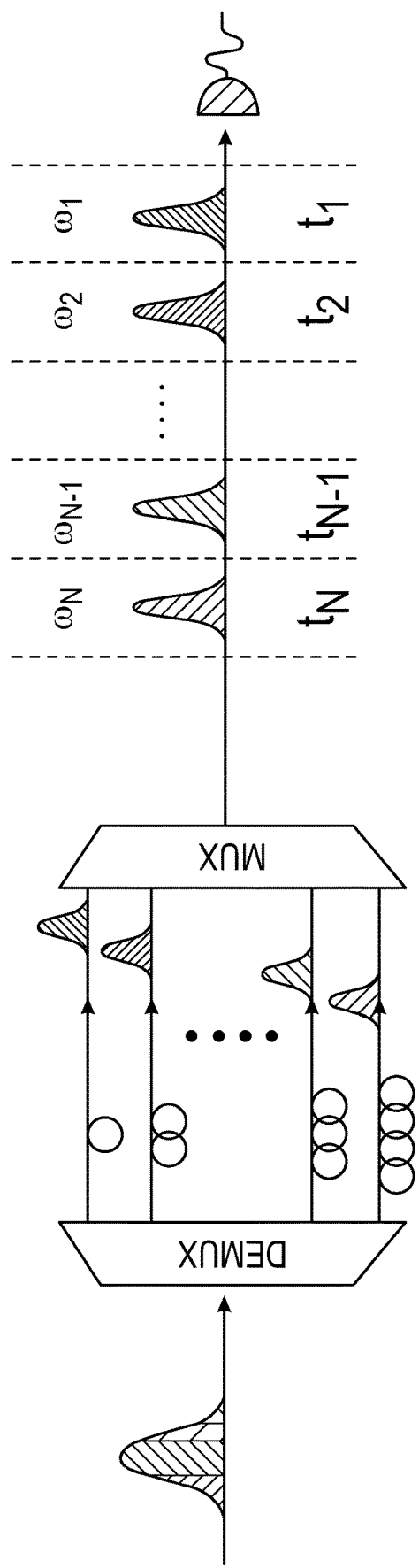
FIG. 12 is a diagram illustrating discretized frequency-time conversion with a dense wave division multiplexing (DWDM) delay for use with the system of FIG. 1, in accordance with examples of the present disclosure.

FIG. 12 illustrates discretized frequency-time conversion with a dense wave division multiplexing (DWDM) delay. For example, by using a demultiplexer (DEMUX), the available single-photon spectra may be divided into up to a number of spectral channels. The DEMUX output channels are connected to optical fibers of different lengths and fiber polarization controllers. The DEMUX output channels are then recombined into a single-mode optical fiber by using a multiplexer (MUX).

Measurement of the photon's arrival times correlation may be performed using group velocity dispersion (GVD). GVD is a characteristic of a dispersive medium, used most often to determine how the medium will affect the duration of an optical pulse traveling through the medium. For example, +/−GVD may be used (i.e., where GVD>0 for one path and GDV<0 for the other path).

Figure 13:
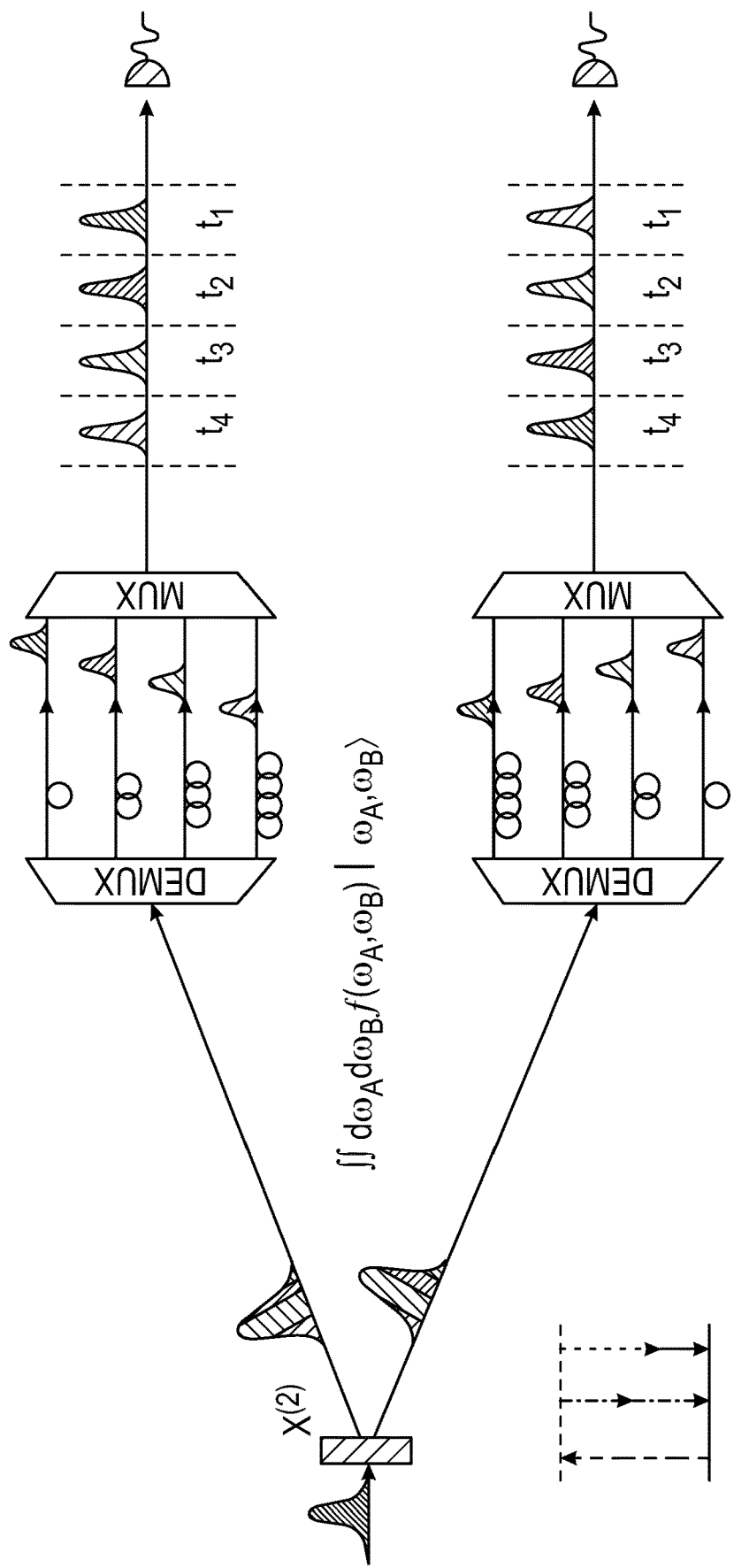
FIG. 13 is a diagram illustrating frequency anti-correlation measurement may be performed using DWDM delays for use with the system of FIG. 1, in accordance with examples of the present disclosure.
Figure 14:
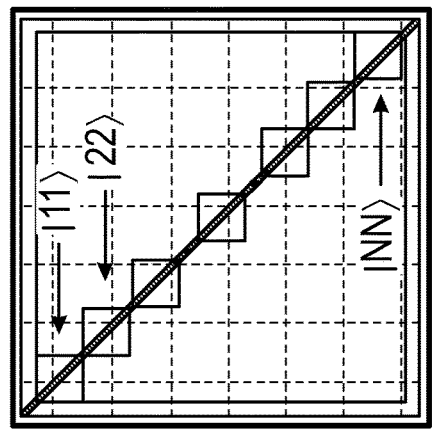
FIG. 14 is a diagram illustrating frequency correlation measurement with DWDM delays for use with the system of FIG. 1, in accordance with examples of the present disclosure.
Figure 14:
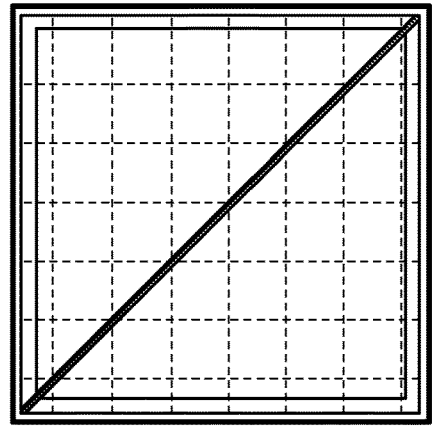

FIG. 13 is a diagram illustrating frequency anti-correlation measurement may be performed using separate DWDM delays. FIG. 14 is a diagram illustrating frequency correlation measurement with DWDM delays. The SPDC bandwidth and a resolution of the DWDM delay may be used to determine frequency discretization. A correlation matrix for the discretized frequency/time bins is shown.

Figure 15:
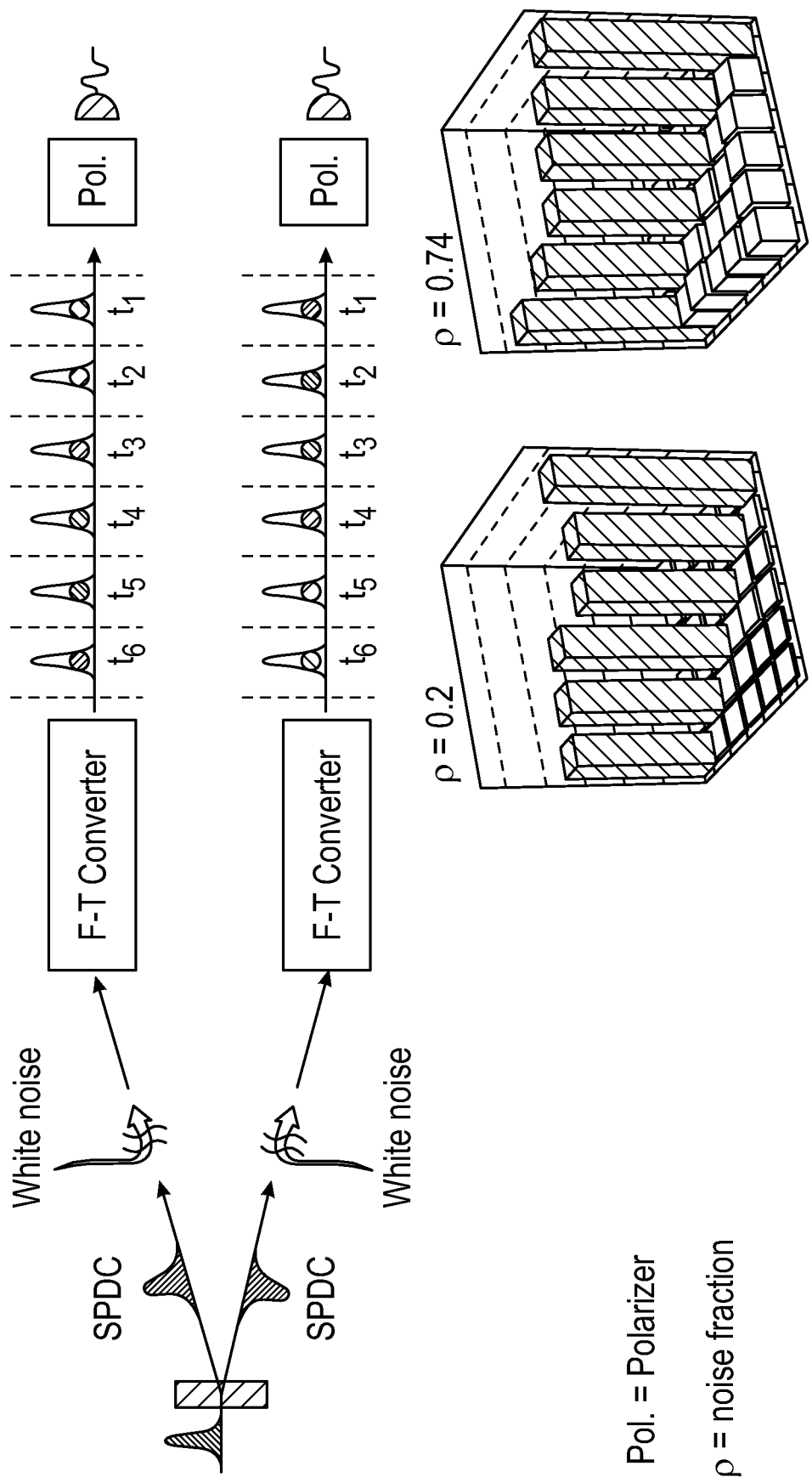
FIG. 15 is a diagram illustrating frequency/time-bin correlation measurement for use with the system of FIG. 1, in accordance with examples of the present disclosure.

FIG. 15 is a diagram illustrating frequency/time-bin correlation measurement for use with the quantum system of FIG. 1. A frequency/time converter and a temporal/polarization measurement along with the noise portion p is shown. This figure illustrates that the noises do not affect the diagonal signal (FIG. 14) very much, thus providing an improvement to SNR.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For example, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:
1. A system for noise-resistant quantum communication, the system comprising:
   a quantum system including a plurality of qubits;
   a processor; and
   a memory, including instructions stored thereon, which, when executed by the processor, cause the quantum system to:
      access a signal of a quantum system;
      perform hyperentanglement of the plurality of qubits via an entanglement source, wherein the hyperentanglement of the plurality of qubits is in at least two dimensions, and wherein the at least two dimensions include a first dimension and a second dimension;

transmit the hyperentangled plurality of qubits via a communication channel;

obtaining a communication of the signal with the first dimension of the at least two dimensions; and filter results of the communicated signal based on the second dimension of the at least two dimensions.

2. The system of claim 1, wherein the at least two dimensions include at least two separate degrees of freedom.

3. The system according to claim 1, wherein the at least two dimensions include at least two of: polarization, frequency-time, energy-time, orbital angular momentum, time-bin, or position-momentum.

4. The system of claim 3, wherein the entanglement source includes spontaneous parametric down-conversion.

5. The system of claim 4, wherein the hyperentanglement is performed by spontaneous parametric down-conversion via the entanglement source.

6. The system of claim 4, wherein the spontaneous parametric down-conversion is performed by a periodically poled Lithium Niobate crystal pumped by a second harmonic of a picosecond mode-locked fiber laser.

7. The system of claim 1, wherein the instructions, when executed by the processor, further cause the quantum system to communicate the signal.

8. A method for noise-resistant quantum communication, the method comprising:

accessing a signal of a quantum system, wherein the quantum system includes a plurality of qubits;

obtaining hyperentanglement of the plurality of qubits via an entanglement source, wherein the hyperentanglement of the plurality of qubits is in at least two dimensions, wherein the at least two dimensions include a first dimension and a second dimension;

transmitting the hyperentangled plurality of qubits via a communication channel;

performing a communication of the signal with the first dimension of the at least two dimensions;

filtering results of the communicated signal based on the second dimension of the at least two dimensions; and communicating the filtered results of the communicated signal.

9. The method of claim 8, wherein the two dimensions include at least two separate degrees of freedom.

10. The method of claim 8, wherein the two dimensions include polarization and frequency-time, wherein the qubits include polarization-frequency hyperentangled photon pairs, and wherein the method further includes:

discretizing a correlated spectra of the polarization-frequency hyperentangled photon pairs into a correlated frequency bin measurement and a correlated time-bin measurement; and deterministically mapping the correlated frequency bin measurement to the correlated time-bin measurement.

11. The method of claim 8, wherein the qubits include signal entangled photons, and wherein the method further includes distinguishing noise photons from signal entangled photons.

12. A non-transitory computer-readable storage medium storing a program for causing a quantum system to execute a method for noise-resistant quantum communication, the method comprising:

accessing a signal of a quantum system, the quantum system includes a plurality of qubits;

obtaining hyperentanglement of the plurality of qubits via an entanglement source, wherein the hyperentanglement of the plurality of qubits is in at least two dimensions, wherein the at least two dimensions include a first dimension and a second dimension;

transmitting the hyperentangled plurality of qubits via a noisy quantum channel;

performing a communication of the signal with the first dimension of the at least two dimensions;

filtering results of the communicated signal based on the second dimension of the at least two dimensions; and communicating the filtered results of the communicated signal.

* * * * *